United States Patent [19]

Li et al.

[11] Patent Number: 5,614,711

[45] Date of Patent: Mar. 25, 1997

[54] TIME-OF-FLIGHT MASS SPECTROMETER

[75] Inventors: Gangqiang Li; Gary M. Hieftje, both of Bloomington, Ind.

[73] Assignee: Indiana University Foundation, Bloomington, Ind.

[21] Appl. No.: 434,931

[22] Filed: May 4, 1995

[51] Int. Cl.⁶ .............................. B01D 59/44; H01J 49/00
[52] U.S. Cl. ..................................... 250/287; 250/282
[58] Field of Search .................................. 250/281, 282, 250/287, 288

[56] References Cited

U.S. PATENT DOCUMENTS

| | | | |
|---|---|---|---|
| 3,634,683 | 1/1972 | Bakker | 250/287 |
| 4,458,149 | 7/1984 | Muga | 250/287 |
| 5,032,722 | 7/1991 | Boesl et al. | 250/287 |
| 5,073,713 | 12/1991 | Smith et al. | 250/287 |
| 5,144,127 | 9/1992 | Williams et al. | 250/287 |
| 5,196,708 | 3/1993 | Mullock | 250/286 |
| 5,396,065 | 3/1995 | Myerholtz et al. | 250/287 |

FOREIGN PATENT DOCUMENTS

| | | |
|---|---|---|
| 8900228 | 2/1987 | U.S.S.R. . |
| 2274197 | 7/1994 | United Kingdom . |

OTHER PUBLICATIONS

Dodonov et al, *Electrospray Ionization on a Reflecting Time–of–Flight Mass Spectrometer*, ACS Book (1993).
Houk, R.S., Anal. Chem., vol. 58, No. 1, p. 97A (1986).
Kutscher et al., *A Transversally & Longitudinally Focusing Time–of–Flight Mass Spectrometer*, Journal of Mass Spectrometry Ion Physics, vol. 103, p. 117 (1991).
Wiley and McLaren, Rev. Sci. Instrum., vol. 26, p. 1150 (1955).
Mamyrin et al., Soviet Physics, J.E.P.T., vol. 37, p. 45 (1973).
Benninghoven et al., Organic Mass Spectrometry, vol. 12, p. 593 (1977).
Karas et al., Interntational Journal of Mass Spectrometry Ion Proceedings, vol. 92, p. 231 (1989).
O'Harleron et al., Technical Document Report No. ASD TDR 62–644, Parts I and II (1964).
Sin et al., Analytical Chemistry, vol. 63, p. 2897 (1991).
Dodonov et al., Book of Abstracts from the Twelfth International Mass Spectrometry Conference, Amsterdam (1991).

(List continued on next page.)

*Primary Examiner*—Bruce C. Anderson
*Attorney, Agent, or Firm*—Price, Heneveld, Cooper, DeWitt & Litton

[57] ABSTRACT

A novel, time-of-flight mass spectrometer for the qualitative and quantitative analysis of elemental, molecular, and isotopic chemical samples is provided which offers increased sensitivity, speed of analysis, resolving power, and signal-to-noise ratios than prior mass spectrometers by properly sampling and collimating an ion beam from a continuous ion source, decelerating said ion, forming ion packets from the continuous ion beam, storing said ion packets, extracting and accelerating the ion packets along a stable flight path, transversely compressing said packets, focusing ions of similar mass, and detecting the focused ion masses. The mass spectrometer includes an ion optics assembly and an analyzer disposed along a common axis coincident with a continuous beam of sampled ions. The relationship between the ion extractor and accelerator are such that ions of isomass are focused at at least one point in space in the analyzer along a narrow flight path so as to be either removed from the flight path or allowed to proceed and be detected at substantially the same time. The separate modulation and extraction steps, when coupled with the space-focusing and selected deflection of certain ionic species, results in higher sensitivity, greater analysis speed, higher resolving power, and improved signal-to-noise ratio than achieved in prior orthogonal or on-axis time-of-flight mass spectrometers. A novel method achieved by the apparatus is also disclosed.

61 Claims, 4 Drawing Sheets

OTHER PUBLICATIONS

Coles et al., Proceedings of the Fortieth ASMS Conference on Mass Spectrometry and Applied Topics vol. 10 (1992).

Boyle et al., Analytical Chemistry, vol. 64, p. 2084 (1992).

Myers and Hieftje, Michrochemical Journal (1993).

Cameron, A.E.; Eggers, D.F.; Rev. Sci. Instrum., vol. 19, p. 605 (1948).

Futrell et al., *Modification of Time–of–Flight Mass Spectrometer for Investigation of Ion–Molecule Reations at Elevated Pressures*, Rev. Sci. Instrum., vol. 39, No. 3, p. 340 (1968).

Miller et al., *Improvement of Spectral Baseline Stability for a Time–of–Flight Mass Spectrometer Operated at Elevated Pressures*, Rev. Sci. Instrum., vol. 40, p. 503 (1969).

Studier, Martin, *Continuous ION Source for a Time–of–Flight Mass Spectrometer* Rev. Sci. Instrum., vol. 34, No. 12 p. 1367 (1963).

Di Valentin and Dove, *Satellite Mass Peaks in Time–of–Flight Mass Spectrometry of Ions Continuously Sampled From an External Source*, International Journal of Mass Spectrometry and Ion Physics, p. 359 (1973).

Fowler and Good, *A Theory on Obtaining Short Bursts of Ions from a Beam of Ions*, Nuclear Instruments and Methods, vol. 7, p. 245 (1960).

Sanzone, George, *Energy Resolution of the Conventional Time–of–Flight Mass Spectrometer* Rev. Sci. Instrum., vol. 41, No. 3, p. 741 (1970).

Pinkston et al., *New Time–of–Flight Mass Spectrometer for Improved Mass Resolution, Versatility, and Mass Spectrometry/Mass Spectrometry Studies*, Rev. Sci. Instrum., vol. 57 (4), p. 583 (1986).

Cotter, R.G., *Electrospray Ionization on a Reflecting Time–of–Fligh Mass Spectrometer*, ACS Book (1994).

Gohl et al., *Time–of–Flight Mass Spectrometry for Ions of Large Energy Spread*, International Journal of Mass Spectrometry and Ion Physics, vol. 48, p. 411 (1983).

Boesl, et al., *A High–Resolution Time–of–Flight Mass Spectrometer with Laser Desorption and a Laser Ionization Source*, Analytical Instrumentation, vol. 16(1), p. 151 (1987).

Bakker, J. M. B., *A Beam–Modulated Time–of–Flight Mass Spectrometer Part I: Theoretical Considerations*, Scientic Instruments, vol. 6, No. 8, p. 677 (1973).

Mamyrin and Shmikk, *The Linear Mass Reflection*, Soviet Physics, J.E.P.T., vol. 49(5) (1979).

Bakker, J.M.B., *A Beam–Modulated Time–of–Flight Mass Spectrometer; Part II Expiremental Work*, Scientific Instruments, vol. 7, No. 5, p. 364 (1974).

Yefchak et al., *Beam Deflection for Temporal Encoding in Time–of–Flight Mass Spectrometry*, Journal of American Society for Mass Spectrometry. vol. 1, No. 6 (1990).

Ma, C. et al., *The Design of an Atmospheric Pressure Ionization/Time–of–Flight Mass Spectrometer Using a Beam Deflection Method*, Rev. Sci. Instrum., vol. 63, p. 139 (1992).

Van Breemen et al., *Time–Resolved Laser Desorption Mass Spectrometry*, Journal of Mass Spectrometry and Ion Physics, vol. 49, No. 1 (1983).

Olthoff et al., *Liquid Secondary Ion Time–of–Flight Mass Spectrometry*, Analytical Chemistry, (1987).

Bergmann et al., *High–Resolution Time–of–Flight Mass Spectrometer*, Rev. Sci. Instrum., vol. 60, No. 4 (1989).

Grix, et al., *A Time–of–Flight Mass Analyzer wityh High Resolving Power*, Physikalisches Institut Der Justus–Liebig–Universitat, West Germany (1988).

Karataev et al., *New Method for Focusing Ion Bunches in Time–of–Flight Mass Spectrometers*, Soviet Physics—Technical Physics, vol. 16, No. 7 (1972).

Bakker, J.M.B., *The Time–Focusing Principle: A Double–Focusing Design for Time–of–Flight Mass Spectrometers*, Journal of Mass Spectrometry and Ion Physics, vol. 6, No. 314 (1971).

Poschenrieder, W.P., *Multiple–Focusing Time–of–Flight Mass Spectrometers Part II: TOFMS with Equal Energy Acceleration*, Journal of Mass Spectrometry and Ion Physics, vol. 9, No. 4 (1972).

Kinsel and Johnston, *Post Source Pulse Focusing: A Simple Method to Achieve Improved Resolution in a Time–of–Flight Mass Spectrometer*, Int'l Journal of Mass Spectrometry and Ion Processes, vol. 91 (1989).

Dawson and Guilhaus, *Orthogonal–Acceleration Time–of–Flight Mass Spectrometer*, Rapid Communications in Mass Spectrometry, vol. 3, No. 5 (1989).

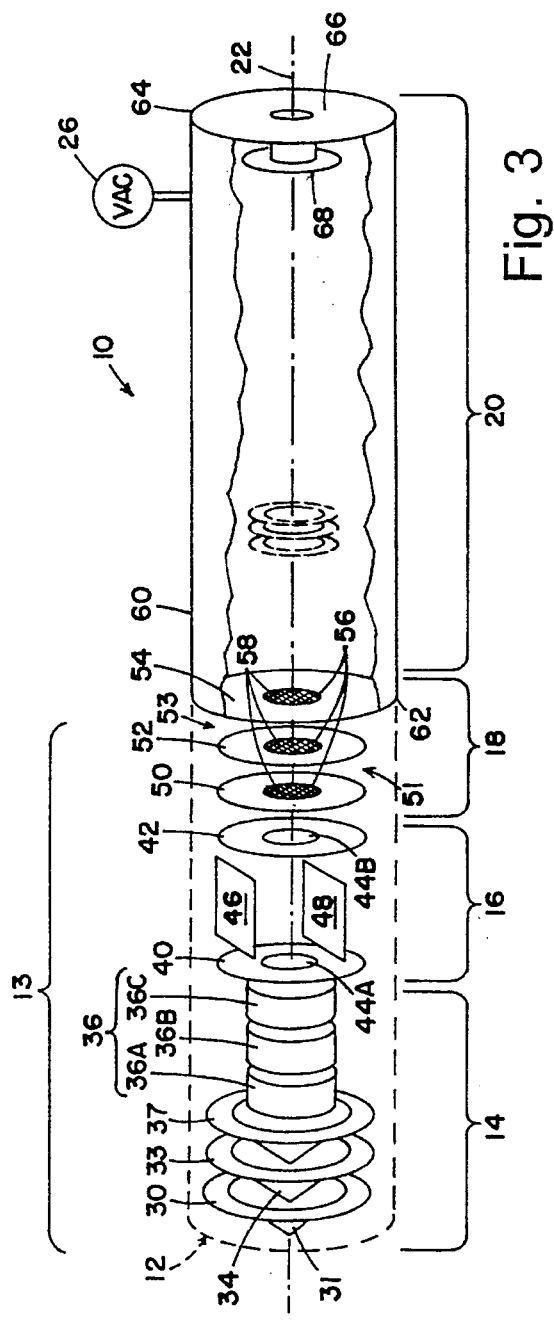
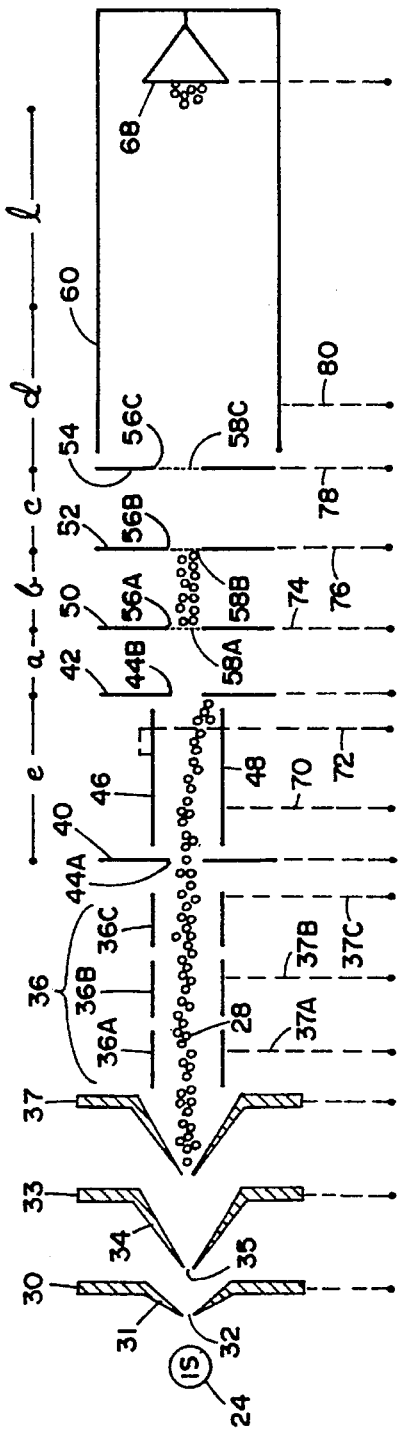

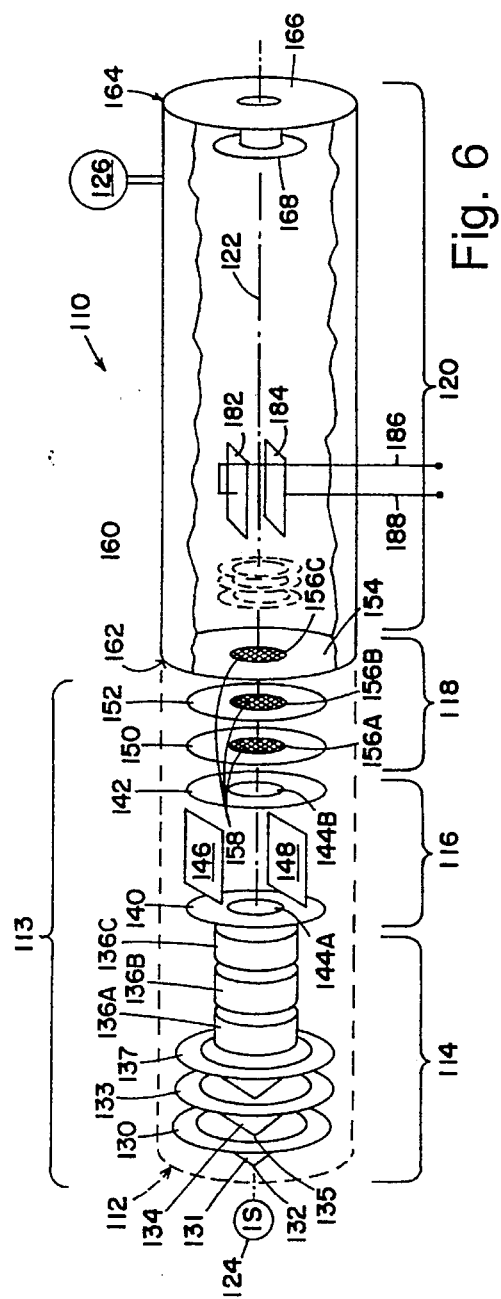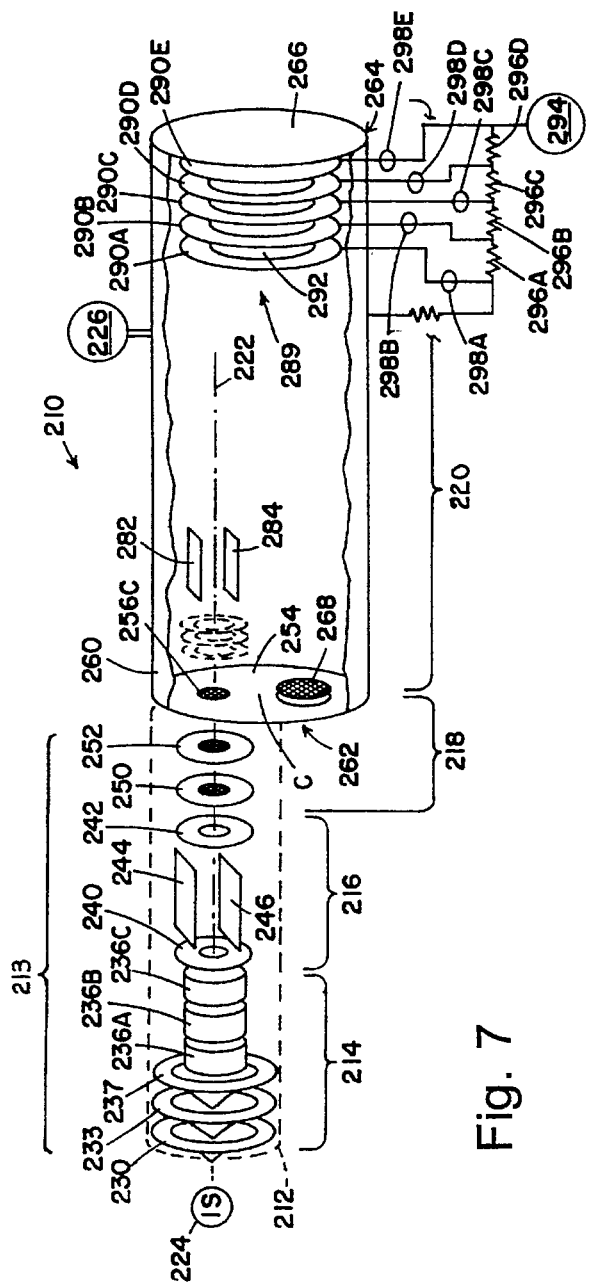

TIME-OF-FLIGHT MASS SPECTROMETER

This invention was made with government support under PHS R01 GM 46853 titled "New Direction in Atomic Spectrometric Analysis" awarded by the National Institutes of Health. The government has certain rights in the invention.

BACKGROUND OF THE INVENTION

1. Field

The invention relates to a method and apparatus for qualitative and quantitative chemical analysis and, more particularly, to a method and apparatus for increasing the sensitivity, speed of analysis, resolving power, and signal-to-noise ratio of elemental, isotopic, and molecular analysis by properly forming, focusing, and detecting ions used in such analysis.

2. Discussion of the Related Art

Time-of-flight mass spectrometry has had a checkered history since it became commercially available following the innovations of the Wiley-McLaren design in 1955. These instruments were used for a wide range of applications facilitated by its very fast scan capability and/or ease of access to the ion source. However, because they were seen as having both low resolution and low sensitivity, these instruments never became widely utilized in the major areas of mass spectrometry. The resurgence of interest in the time-of-flight technique since the mid-1980s has been due to the advent at the forefront of mass spectrometry development of such techniques as laser and plasma desorption, laser ionization, and surface analysis, which require a complete spectrum for each ionization event and also an extended mass range.

Time-of-flight mass spectrometers operate on the simple principle that ions of differing mass/charge (m/q) ratios, but equal kinetic energy, when projected into an electric-field-free region, will separate according to their m/q ratios. Since charge is nominally unity, the separation occurs as a function of mass. If the ions travel a fixed distance (l) to a detector, then the "time-of-flight" (TOF) is given by the expression:

$$t = l \sqrt{\frac{m}{2zeV}} \quad (1)$$

when (z is the ion charge, e is the electronic charge, and V is the accelerating voltage). In this case of constant ion energy, the flight time (t) is proportional to the square root of the ion mass. The light ions reach the detector before the heavy ones. By measuring the flight time, t, of ions from the ion source to the detector, the ion mass is determined.

In comparison to sector-field mass spectrometers or quadrupole mass spectrometers, a time-of-flight mass spectrometer is advantageous in some applications in which: (1) an extended mass range is required; (2) ion production is pulsed or transient; and (3) the spectrum should be recorded in microseconds. Despite their advantages, the early time-of-flight mass spectrometers were not widely used. This was mainly a result of their poor mass resolving power which was particularly limited by (1) the length of the ion packet produced which depends upon the method of ion production and the geometric construction of the ion source, and (2) energy spread of an ion packet which is due to initial energy distribution and also to the method of ion acceleration. These two factors caused a certain time spread ($\Delta t$) at the ion detector, even for ions of identical mass-to-charge ratio, m/q.

A time-of-flight mass spectrometer has a high transmission efficiency, so its sensitivity should be very high. However, because a time-of-flight mass spectrometer works with short ion bunches which usually are only a few nanoseconds in length, the sensitivity of a time-of-flight mass spectrometer is degraded greatly when the ions to be analyzed are continuously produced.

Two important improvements were made in time-of-flight mass spectrometers as a result of the work of WILEY AND MCLAREN, REVIEW OF SCIENTIFIC INSTRUMENTS, Vol. 26, 1150 (1955), and MAMYRIN ET AL., SOVIET PHYSICS, J.E.P.T., Vol. 37, 45 (1973). In 1955, Wiley and McLaren described a time-of-flight mass spectrometer with an electron impact ion source using so-called "space focusing" and "time-lag" techniques. Following this technique, the time spread caused by the length of ion packets and by the initial energy distribution was substantially reduced. In 1973, Mamyrin et al. first used an ion reflector for the compensation of the energy spread of ion packets. By using "space focusing" and combining it with an ion reflector, higher mass resolving power was also attained, as published by KUTSCHER ET AL., with a transversely and longitudinally focusing time-of-flight mass spectrometer, in INTERNATIONAL JOURNAL OF MASS SPECTROMETRY ION PHYSICS, Vol. 103, 117–128 (1991). Owing to their higher sensitivity for pulsed ion production and the fact that no mass-range limit existed, time-of-flight mass spectrometers were favored for detecting large biomolecules produced by plasma desorption (MACFARLANE ET AL., BIOCHEM. BIOPHYS. RES. COMMISS., Vol. 60, p. 616 (1974)), secondary ion emission (BENNINGHOVEN ET AL., ORGANIC MASS SPECTROMETRY, Vol. 12, p. 593, (1977)) or laser desorption techniques (KARAS ET AL., INTERNATIONAL JOURNAL OF MASS SPECTROMETRY ION PROCEEDINGS, Vol. 92, p. 231 (1989)). A time-of-flight mass spectrometer for analysis of chemical species in a plasma jet was first studied by O'HALERON ET AL., TECHNICAL DOCUMENT REPORT NO. ASD TDR 62-644, PARTS I AND II (1964) (prepared under Contract No. AF 33 (657)-11018 by the Bendix Corporation, Research Laboratories Division, Southfield, Mich.). Some other instruments for sampling ions from atmospheric-pressure, however, were not built until the beginning of this decade (SIN ET AL., ANALYTICAL CHEMISTRY, Vol. 63, p. 2897 (1991); DODONOV ET AL., BOOK OF ABSTRACTS FROM THE TWELFTH INTERNATIONAL MASS SPECTROMETRY CONFERENCE, AMSTERDAM (1991); COLES ET AL., PROCEEDINGS OF THE FORTIETH ASMS CONFERENCE ON MASS SPECTROMETRY AND APPLIED TOPICS, p. 10 (1992); BOYLE ET AL., ANALYTICAL CHEMISTRY, Vol. 64, p. 2084 (1992); and MYERS AND HIEFTJE, MICROCHEMICAL JOURNAL, Vol. 48, p. 259 (1993).

ORTHOGONAL AXIS TIME-OF-FLIGHT MASS SPECTROMETERS

Most time-of-flight mass spectrometers used for sampling ions from a continuous atmospheric-pressure or reduced-pressure source are operated in the "orthogonal acceleration" or "right-angle extraction" mode such as shown in FIG. 1. The ions produced at atmospheric-pressure or low pressure expand continuously into a vacuum chamber by means of a 3-step differential pumping system. Several ion optical lenses collimate the continuous ion beam into an extraction region which consists of several electrodes (see FIG. 1). Usually, the ions enter an extraction region which is field free. Ions of all masses, which have the same velocity due to the supersonic expansion process, cross this region without experiencing any electrical force. When an electrical pulse or bias is supplied to the back electrode G0, the ions in the extraction region are accelerated in a direction generally perpendicular to the original axis of the beam in the vacuum chamber. Repeating this pulse periodically, ion packets are generated at the repetition rate of the pulse. The ions are further accelerated by a constant electrical field into a field-free region (flight tube) and then are mass analyzed according to equation (1). There are two particular processes which occur simultaneously upon application of an electrical pulse to the back electrode G0, i.e., conversion of the continuous ion beam into the ion packets and extracting these ion packets into the time-of-flight analyzer. These two processes shall be referred to as "beam modulation" and "ion extraction," respectively.

The duty cycle of the spectrometer, meaning the fraction of ions originally in the continuous ion beam that are converted into the ion packets, affects the sensitivity of the time-of-flight mass spectrometer. If the velocity of ions before the modulation is $v_y$, the open aperture of the orthogonal extraction region is a, and the pulsing frequency is f, the "duty cycle" is controlled by the expression:

$$\text{duty cycle} = \frac{af}{v_y} \tag{2}$$

The velocity $v_y$ is determined by the supersonic expansion and is usually assumed to be $7 \times 10^3$ meters per second (m/s) for a typical atmospheric-pressure ion source. The pulsing frequency, f, is dependent on the operating conditions of the mass spectrometer and the heaviest detectable mass. With an acceleration energy of 2 kiloelectron volts (keV), a flight length of 1 meter, and a maximum mass range of 300 Dalton, a repeating frequency of 36 kilohertz (kHz) is possible. An open aperture, a, of 2.5 centimeters (cm) yields a duty cycle of 0.13. This means, under the conditions described above, 13 percent of the ions originally in the continuous beam are converted into ion packets and can ultimately be detected.

The maximum mass resolving power is dependent on the configuration of the time-of-flight mass spectrometer and on the velocity distribution of the ion packets in the direction of acceleration caused by the initial energy spread in a supersonic ion beam. Since the motion of ions in the direction of the supersonic beam and in the direction of acceleration are independent of each other, this velocity distribution is very small and its effect on the mass resolving power is negligible.

Since the supersonic ion beam and the flight tube are perpendicular to each other, there is no direct path for the photons or neutrals to reach the detector. In such a configuration, no photon-stop or curved ion path is needed, as it is in the case of sampling ions from an atmospheric-pressure plasma into a quadrupole mass spectrometer. Consequently, the design of an optical system for sampling and collimating the ion beam becomes simpler; all ion-optical elements can be disposed along a straight exit. Additionally, the ion throughput is higher, the noise caused by photons and neutral species is reduced, and the signal-to-noise ratio increases accordingly. However, some facts which directly result from the "orthogonal acceleration" principle limit sensitivity, mass resolving power, and signal-to-noise ratio, and thus degrade the instrument performance. First, as briefly mentioned above, the duty cycle of the system is directly proportional to the open aperture, a, of the extraction region. In order to obtain a duty cycle of 13 percent, for example, the aperture, a, must be 2.5 cm in diameter. This means that the cross section of the extracted ion beam at the exit of the ion source is at least 2.5 cm. If such a beam is even slightly divergent from the flight path or axis of the flight tube, it would become very wide by the time it reaches the ion detector, so, many of the ions it contains would miss the detector. Using ion-optical elements to focus this beam is usually difficult because of its size. Secondly, the drift paths of the ions are not parallel to the optical axis of the flight tube and also not parallel to each other for ions of different masses. The angle of the ion path, $\propto$, with respect to the axis of the flight tube, is dependent on the ion mass and is given by the expression:

$$\alpha = v_y (m/2K)^{1/2} \tag{3}$$

Since the ions of all masses have nearly the same kinetic energy, K, in the drift region and a nearly constant perpendicular velocity component, $v_y$, the angle, $\propto$, is proportional to the square root of mass, m. Consequently, after passing the drift length, l, ions of different masses are separated laterally from each other at the plane of the ion detector by a distance, $\Delta y$, determined by the expression:

$$\Delta y = \frac{1}{2} v_y (2Km)^{-\frac{1}{2}} l\Delta m \tag{4}$$

where $\Delta m$ is the mass difference between the two ions and $\Delta y$ is the distance between the ions at the detector plane. Assuming that $v_y$ equals $7 \times 10^3$ m/s, K equal 2 keV, and l equals 1 m, the distance $\Delta y$ between masses 10 and 250 Daltons would be about 14 cm. Usually, the size of the ion detector used in time-of-flight mass spectrometers is only about 2 to 4 cm in diameter, much smaller than the ion displacement calculated above. Thus, using such an ion detector, it is not possible to record the ions of all masses at the same high efficiency. Consequently, the ion loss becomes greater and the sensitivity of the time-of-flight instrument decreases.

Moreover, because the ions continuously expands into the mass spectrometer and because only a fraction of this continuous flow is converted into ion packets, other ions can penetrate from the extraction region into the flight tube. These ions then undergo scattering and are accelerated toward the detector. This process, therefore, directly results in a high level of background noise.

If a higher mass resolving power is desired, it is necessary to use an ion reflector for compensation of the time error caused by the energy spread of the ions. However, well-collimated ion packets are preferred since the ion reflector can accept ion packets with only a certain cross section. In the orthogonal axis time-of-flight mass spectrometer example given above, the cross section of the ion beam is significantly large due to the ion displacement, when compared to the open aperture of the ion reflector. Most ions would hit the electrodes of the ion reflector, and thus not pass the ion reflector. Therefore, the ion transmission in an orthogonal time-of-flight mass spectrometer, using the ion reflector, will be lower than in a linear mode.

ON-AXIS TIME-OF-FLIGHT MASS SPECTROMETER

Another configuration of a time-of-flight mass spectrometer for detecting ions from a continuous beam is the so-called "on-axis" arrangement of BAKKER, J. PHYS. E. SCIENTIFIC INSTRUMENTS, Vol. 6, pp. 785–789 (1973), such as shown in FIG. 2. In this design, the drift or flight tube of the spectrometer is in line with the continuous ion beam extracted from the source. After being accelerated to an adequate velocity, the ion beam travels through an electric field which is generated by two parallel modulating plates. The field is changed periodically by changing the electrical bias applied to the plates. As a consequence, the ion beam is swept in a direction perpendicular to its original flight path. A slit in a plate in from of the ion detector is much narrower than the width of the beam. As the ion beam is swept over the slit, only the ions in a short time packet reach the ion detector. One deflection pulse corresponds to the creation of a single ion packet and, thus, to a single time-of-flight spectrum.

In an on-axis time-of-flight mass spectrometer, the maximum attainable resolving power and the duty cycle are coupled. Both are dependent on the cross section of the original ion beam, the width of the slit in the plate ahead of the ion detector, and several other factors. Every change of these parameters made to improve the mass resolving power degrades the duty cycle and vice versa. The conversion efficiency from a continuous ion beam into ion packets is only about $10^{-4}$ to $10^{-2}$. This is approximately 10 to 1,000 times worse than achieved in a right-angle or orthogonal-axis time-of-flight mass spectrometer. Furthermore, the ions are continuously injected into the flight tube. The portion of ions which are not detected may hit the flight tube wall while the beam is being swept and cause a scattering of the ions. Consequently, the noise from scattered ions on the ion detector may be substantially high. Since, in principle, there is no stable ion beam in the flight tube because of the beam sweeping, it is not possible to use an ion reflector to improve mass resolving power.

When a time-of-flight mass spectrometer is used for sampling ions from a plasma ion source, such as an inductively coupled plasma (ICP) or glow discharge (GD), it is often necessary or desirable to remove certain ion species before they strike the ion detector. Such ions are usually not those which are to be analyzed but instead are those of the plasma gas (for example, Ar+) or those introduced with the sample or solvent; they are usually present in high concentration. When such concentrated ion species strike the ion detector, they can paralyze it or reduce its sensitivity, precluding the determination of isotopes surrounding them. A conventional method to prevent these ion species from reaching the detector is the use of deflection plates which are usually a pair of electrodes arranged adjacent the extraction region and parallel to the flight path of ions. By applying an electrical pulse to one of the electrodes at a predetermined time, ions of a desired mass can be removed from their flight path as desired. However, this method of ion removal is not very effective in an orthogonal-acceleration time-of-flight mass spectrometer due to the large spatial cross section of the ion packets; the remaining ion signal is usually still intense enough to paralyze the detector. In an on-axis time-of-flight mass spectrometer, such as that described above (BAKKER), this ion deflection method cannot be used at all, simply because there is no stable flight path.

SUMMARY OF THE INVENTION

The instant invention is directed toward a time-of-flight mass spectrometer having a duty cycle and a mass resolving power at least as good as that achieved in orthogonal time-of-flight mass spectrometers but using a configuration which is partly similar to an on-axis time-of-flight mass spectrometer. The combination of characteristics of both designs offers all the advantages of an orthogonal time-of-flight mass spectrometer and overcomes its disadvantages, resulting in increased sensitivity, mass resolving power, signal-to-noise ratio for isotopic, molecular, and elemental analysis than prior systems.

According to one form of the invention, these principles are achieved by initially modulating an ion beam to produce the ion packet having a small cross-sectional profile perpendicular to the direction of propagation and, secondly, extracting the ion packet along the direction of propagation through an acceleration region. This sequential treatment of the ion packet results in a more stable flight path of the ion packet with more ions being detected than achieved previously.

In another form of the invention, the time-of-flight mass spectrometer provides first and second order space focusing of the ion packet to decrease the spread between ions of the same mass and lessen the undesirable time error commonly found in time-of-flight mass spectrometers. This first and second order space focusing of the ion packet is achieved by a predetermined spacing between the repelling or extraction plates and the acceleration plates.

Another form of the invention provides sequential ion-beam modulation and ion-packet extraction/acceleration functions, first and second order space focusing capabilities, as well as an ability to remove certain ion species from the ion flight path. This selected removal of undesired ion species results in reduced background noise, and less complication from detector saturation and space charge.

Yet another form of the invention provides sequential ion-beam modulation and extraction functions, space focusing, and ion deflection, and further provides ion-beam deceleration and selectable duty factor capabilities for variable signal integration and an ion accumulation period.

Still another form of the invention includes all of the functions identified above, including an ion reflector or reflectron for further reducing time errors caused by the kinetic energy variation of ions of similar mass in a packet and thereby improves the overall resolving power of the spectrometer.

The advantages offered by the time-of-flight mass spectrometer include an increased duty cycle, lower scattered ion or background noise, less difficulty with detector saturation, improved ability to remove unwanted ions from the flight path, higher transmission efficiency, higher mass resolution, improved reflectron performance, increased flexibility in ion detection systems, a reduction of mass bias, improved control of ion-packet generation, and the ability to vary the signal integration/ion accumulation period.

BRIEF DESCRIPTION OF THE DRAWING FIGURES

A better understanding of the invention and the advantages provided thereby may be obtained by reference to the specification and the attached drawing figures, wherein:

FIG. 3 is a schematic diagram of one embodiment of the invention;

FIG. 4 is another schematic diagram of the embodiment shown in FIG. 3;

FIG. 6 is a schematic diagram of an alternate embodiment of the mass spectrometer of this invention;

FIG. 7 is a schematic diagram of yet another embodiment of the mass spectrometer of this invention;

DETAILED DESCRIPTION OF THE PREFERRED EMBODIMENTS

DEFINITIONS

Figure 1:
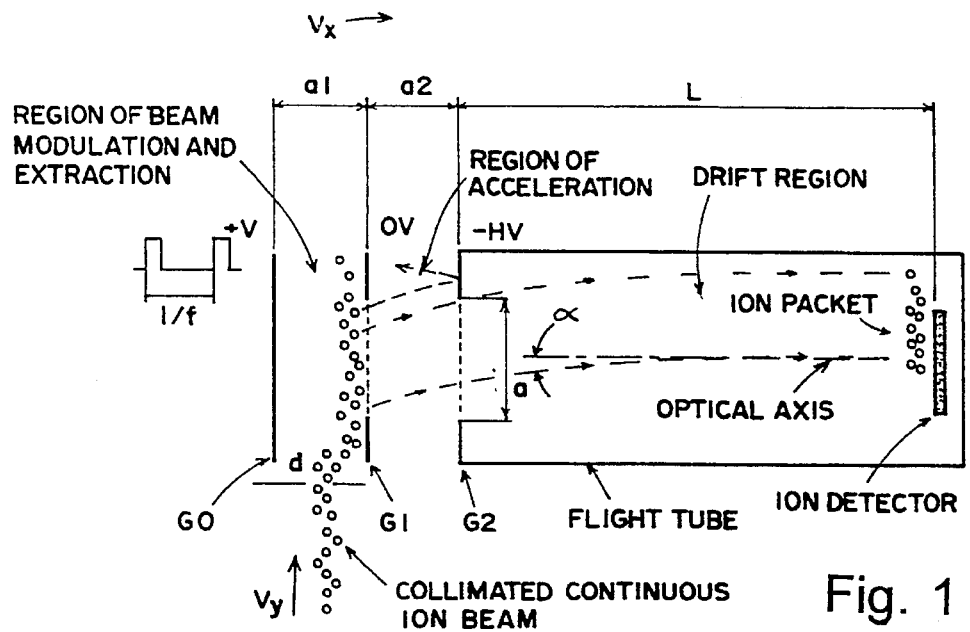
FIG. 1 is a schematic diagram of a typical orthogonal-axis mass spectrometer.

Beam Modulation: Conversion of a continuous beam of ions to a sequence of ion packets or bundles having a predetermined length and a generally narrow cross section transverse or perpendicular to the direction of travel.

Duty Cycle: The fraction of time that ions in a continuous beam are mass analyzed and detected.

Ion Transmission Efficiency: Ratio of the number of ions which are extracted to the number of ions which are detected.

Ion Extraction: Extraction of an ion packet from a predetermined electrode assembly by using electrical pulses.

Ion Packet Acceleration: Acceleration of an ion packet into the flight tube of a time-of-flight mass spectrometer.

Supersonic Expansion: Expansion of molecules, atoms, ions, or electrons into a vacuum under conditions where their mean free path is one- to two-orders of magnitude lower than the orifice the species expand through.

DETAILED DESCRIPTION OF THE INVENTION

Referring to FIGS. 3 and 4, a first embodiment of the time-of-flight mass spectrometer 10 includes a housing 12 containing an ion optics assembly generally indicated as 13 and an analyzer assembly 20, all arranged along a longitudinal axis 22. The overall dimensions of the mass spectrometer of FIG. 3 may vary, but it will be desirable to be as compact as physically possible. For example, it is contemplated that the analyzer assembly 20 may have a length between 0.20 and 3.00 meters. Early prototype analyzer assemblies, such as 20, have been built with lengths of 1.00 and 0.50 meter. The diameter of the analyzer assemblies may also vary, ranging between 0.10 and 0.50 meter. The length of the ion optic assembly, such as 13, may also vary, ranging between 0.10 and 0.50 meter, preferably between 0.25 and 0.50 meter, and most preferably around 0.25 meter.

Ion optics assembly 13 contains several assemblies including a sampling assembly 14, a beam collimating assembly 36, a beam modulation assembly 16, and an ion packet extraction/acceleration assembly 18, all similarly arranged along the axis 22. Sampling assembly 14 includes a sampling cone 30 wherein the tip of the cone 31 contains a small aperture 32 through which an ion sample is passed from an ion source 24, located proximate thereto outside housing 12. Adjacent sampling cone 30, and spaced therefrom by a predetermined distance is a skimmer cone 33 wherein the cone portion 34 is concentric with cone 31 and also includes a small aperture 35 at its tip for the passage of ions received from sampling cone 30. Disposed toward the interior of ion optics assembly 13 and adjacent skimmer cone 33 is an ion beam collimating assembly 36 having a plurality of electrode disks 36a, 36b, and 36c, each concentric about axis 22 and aligned with the apertures 32, 35 defined at the tips of cones 31 and 34 of the sampling cone and skimmer cone 30, 33, respectively. An additional aperture 38 may be defined in a plate 37 located within ion optics assembly 13 between skimmer cone 33 and the first of the electrode disks 36a in the ion beam collimating assembly 36. With the addition of plate 37, at least three separate chambers are defined with each pumped down to a predetermined pressure by a vacuum pump described below. For example, the chamber defined between sampling cone 30 and skimmer cone 33 may have a pressure of approximately 1 torr or 1/760 of atmospheric-pressure. The chamber defined between skimmer cone 33 and plate 37 may be pumped down to a pressure approximating $1\times10^{-3}$ torr, while the ion beam collimating assembly 36 may be pumped down to a pressure of $1\times10^{-6}$ torr, the preferred operating pressure of the remainder of the mass spectrometer 10.

A continuous beam of ions is drawn from ion source 24 located at the exterior end of housing 12 proximate sampling cone 30. The continuous ion beam passes through the apertures 32, 35 in cones 31, 34 and through aperture 38 in plate 37 at a speed of approximately $7\times10^3$ m/s as a result of the differential pressure of vacuum stages existing in the ion optics assembly 13. As the ion beam passes through the sampling and skimmer cones 30, 33, and plate 37 a different potential is applied to each of the electrode disks 36a, 36b, and 36c to produce electric fields that organize the continuous ion beam into a more tightly compact, collimated beam. Electrode disks 36a, 36b, and 36c are hereinafter referred to as ion collimating assembly 36.

Disposed at an end of ion collimating assembly 36, opposite the skimmer and sampling cones 30, 33, is the beam modulation assembly 16. In one embodiment, assembly 16 includes at least two ion beam cross-section limiter plates or electrodes 40, 42 spaced from each other by a predetermined distance, and each having an aperture 44 aligned along axis 22. Oriented between cross-section limiter plates 40, 42 and oriented generally parallel to axis 22 are first and second beam deflection plates 46, 48, respectively. Each plate is located opposite the other and on opposite sides of axis 22 such that axis 22 is located substantially midway between plates 46, 48. Apertures 44a, 44b in the beam cross-section limiter electrodes or plates 40, 42 restrict the cross section of the continuous ion beam passing therethrough. Although FIG. 3 generally illustrates that apertures 44a and 44b are generally the same diameter, in practice apertures 44a, 44b may be different diameters to control the cross-sectional profile of the ion beam. For example, aperture 44a may have a greater diameter than aperture 44b so as to admit the collimated beam passing from lenses 36a–36c and further limiting the cross section or diameter of the beam as it exits through plate 42.

Adjacent beam modulation assembly 16 is ion packet extraction assembly 18 including at least two electrodes 50, 52 defining an extraction region 51 therebetween and, preferably, including a third electrode 54 spaced from electrode 52 to define an acceleration region 53. Each of the electrodes 50, 52, and 54 includes a centrally disposed aperture 56 concentric with axis 22 and aligned with each other as well as with apertures 44, in the beam modulation assembly and with the electrode disks, plate, skimmer cone, and sampler cone comprising sampling assembly 14. Each of the apertures 56 in electrodes 50, 52, and 54 may also contain a wire grating, grid, or mesh 58, for reasons described below.

All of the separate components described above and comprising the sampling assembly, beam modulation assembly, and ion packet extraction assembly are preferably made from aluminum or steel and more preferably non-magnetic stainless steel, which are less susceptible to corrosion and outgas in vacuum than other metals. Additionally, each of the plates, electrode disks, or electrodes are intended at different time intervals to receive an electrical charge or bias. As a result, it is preferred that each of the components be disposed within assembly 13 so as to be electrically insulated from each other and from outer housing 12. The reasoning behind this is well-known and would be readily apparent to one in the industry.

Disposed on a side of electrode 54 opposite electrodes 50, 52 is the analyzer assembly 20. Analyzer assembly 20 includes a metal flight tube 60 substantially cylindrical in form and having a longitudinal axis coincident with axis 22 of the mass spectrometer 10. A first end 62 of the flight tube 60 is closed by electrode 54, while an opposite end 64 is closed by a plate 66. Extending into the interior of flight tube 60 from plate 66 and disposed along axis 22 is an ion detector assembly 68 such as a microchannel plate (MCP) detector or a secondary electron multiplier (SEM) detector.

In one embodiment of the invention, an ion lens assembly 70, such as an einzel lens assembly, may be located between the last electrode 54 in the ion packet extraction assembly 18 and the ion detector assembly 68. It is preferred that ion lens assembly 70 be arranged co-axially with the ion packet extraction assembly 18. The distance between the ion lens assembly 70 and the extraction assembly 18 is not crucial, although it is preferred that assembly 70 have a minimum aperture at least twice as large as the aperture 56 in electrode 54. The outer and inner diameter and thickness of the electrodes forming the einzel lens can be varied and need not be the same for all of the electrodes forming the lens. This type of lens may be used on all of the embodiments described herein.

The entire mass spectrometer housing 12, including an ion optics assembly 13 and flight tube 60, is under vacuum produced by pump 26. Although it is shown that pump 26 is attached to flight tube 60, one or more pumps or vacuum lines may be used, with each drawing down the pressure in each of the assemblies and chambers described above, such as a rotary-vane pump available from Leybold of Export, Pa., and Turbo Molecular Pumps available from Balzers of Hudson, N.H.

Figure 5:
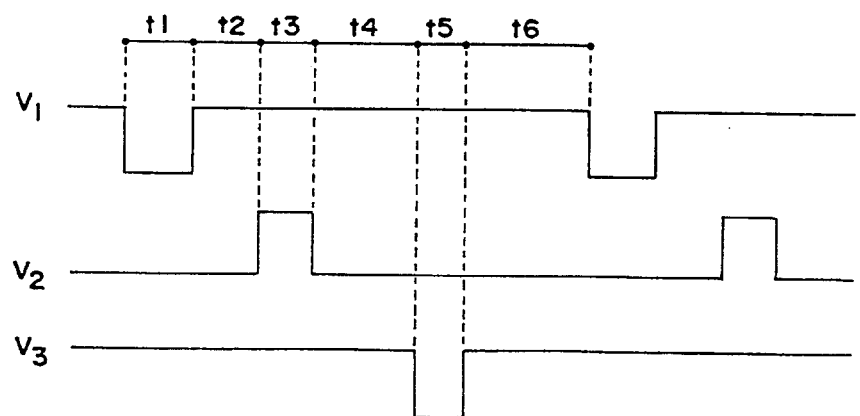
FIG. 5 is a graphical illustration of a time line illustrating potentials on certain electrodes of the spectrometer illustrated in FIG. 4.

The operation of the mass spectrometer 10 is best illustrated by referring to FIGS. 4 and 5. Ions are sampled from an ion source, generally indicated as 24 and located proximate sampling cone 30, to produce a substantially continuous ion beam 28. It is contemplated that a number of ion sources may be used including an inductively coupled plasma (ICP); conductive or nonconductive glow discharge sources, such as disclosed in commonly assigned, co-pending United States Patent Application entitled GLOW DISCHARGE ANALYTICAL INSTRUMENT, Ser. No. 08/099,144 filed Jul. 7, 1993, now U.S. Pat. No. 5,408,315 issued Apr. 18, 1995; and Electrospray Ion Sources, YAMASHITA, ET AL., PHYS. CHEM. Vol. 88, p. 4451 (1984). Additionally, any one of the above ion sources may be adapted to receive and ionize a sample discharged from a liquid or gas chromatograph wherein the sample or analyte exiting the chromatograph column is ionized and then passed to the sampling assembly of the mass spectrometer 10, or from other sampling devices, such as those that employ laser ablation, flow injection, or electrothermal atomization.

The ions produced by ion source 24 are drawn into sampling cone 30 and skimmer cone 33 as a substantially continuous beam by passing through the apertures 32, 35 at a supersonic velocity such as mentioned above. The ion beam 28 passing from skimmer cone 33 through aperture 38 is then collimated by the electric fields produced by the ion lenses formed by electrode disks 36a, 36b, and 36c, generating a field controlled by a potential applied to lines 37a, 37b, and 37c, respectively. Continuous ion beam 28 collimated by lenses 36 then enters beam modulation assembly 16 through aperture 44a. By applying different potentials along lines 70 and 72 to electrodes 48 and 46, ion beam 28 is deflected from axis 22 and impacts electrode 42. At a predetermined instant and for a predetermined period of time, the potential difference across electrodes 46 and 48 is removed so that the region between electrodes 46 and 48 is field free. At this instant, ion beam 28 does not experience any electrical force and, thus, is not deflected and allowed to pass through aperture 44b in electrode 42. At the end of the time period, the potential difference is reapplied to electrodes 46 and 48, causing beam 28 to again deflect and not pass through aperture 44b. By repeating this process at known intervals, ion packets are generated having lengths greater than their widths and oriented parallel to axis 22. All of the ions in each ion packet maintain their initial, relatively low velocity. The initial cross-sectional dimension of the ion packet is controlled to some extent by the diameter of aperture 44b in electrode 42. The length of the ion packet is dependent on the velocity of the ions when they pass through aperture 44a in electrode 40, and on the time period during which the potential difference on electrodes 46 and 48 is zero. If the velocity of the ion beam is represented by v, $t_1$ (see FIG. 5) represents the time period, at which the bias applied to electrode 46 is zero, the length of the ion packets is determined by the expression:

$$\text{Length of ion packet} = vt_1 \quad (5)$$

For example, if $v=7\times10^3$ m/s and $t_1=3.57$ microseconds, the length of the ion packet is 2.5 cm. The method of producing packets of ions in this manner is known as the beam modulation process.

An ion packet produced by beam modulation assembly 16 passes into the extraction region 51 through aperture 56a in electrode 50. Before all the ions in the ion packet enter the extraction region, the potential applied to electrodes 50, 52 over lines 74, 76, respectively, is zero so that the extraction region 51 between the two electrodes is field free. When all of the ions in the packet are in extraction region 51, a positive bias or voltage is passed over line 74 to electrode 50 so that the ions of like charge are forced through aperature 56b in electrode 52. The time at which the extraction pulse is applied to electrode 50 is dependent on the distance between electrodes 42 and 50. In particular, the electrical pulse or bias $V_2$ (FIG. 5) applied to line 74 is applied at a particular time delay, $t_2$, after the modulation pulse $V_1$ switches to zero. If the distance between electrodes 42 and 50 is a, $t_2$ is determined from the expression:

$$t_2 = a/v \quad (6)$$

In the preferred embodiment where electrode 54 is provided, the region 53 between electrodes 52 and 54 is called the acceleration region. At the instant $V_2$ is applied to electrode 50, electrode 54 preferably has a negative potential applied thereto over line 78 such that the ion packet is accelerated across acceleration region 53 into the flight tube 60 at a predetermined, set kinetic energy. The electric potential applied to the flight tube 60 (insulated from housing 12) over line 80 is the same potential (ranging from several hundreds to several thousands of volts) present on electrode 54 so that the flight tube is field free. The ions drift in this region at their final velocity toward ion detector 68. In this technique, modulation of the ion beam occurring in modulation assembly 16 and extraction of ion packets accomplished by assembly 18 occur separately. In comparison to the conventional orthogonal extraction technique or the ion-packet production method according to BAKKER, one more electrical pulse is needed to operate this time-of-flight mass spectrometer. Because this extra pulse offers an additional parameter, the operation of the time-of-flight mass spectrometer is more flexible than prior systems. Some of these operating features will be described later.

When operated in combination with the einzel lens assembly 70, the end electrodes of the einzel lens are connected to the same voltage, usually that to the flight tube 80. The voltage applied to the middle electrode can be higher or lower than the end electrodes. Although both positive and negative lenses are focusing lenses, for a high resolution time-of-flight mass spectrometer, a negative lens is typically used. The voltage of the middle electrode is determined by the ion energy and the flight path in combination with any ion deflector used as described below.

The duty cycle of the mass spectrometer 10, as described above, is at least as good, if not better, as that available in the orthogonal time-of-flight mass spectrometers. If the length of the extraction region 51, i.e., the distance between electrodes 50 and 52 is b and the pulsing frequency is f, the duty cycle is similar to that in the orthogonal time-of-flight mass spectrometers as indicated by the expression:

$$\text{duty cycle} = bf/v \tag{7}$$

The duty cycle can be increased beyond that present in orthogonal time-of-flight mass spectrometers if v becomes small. To achieve this, a small, positive DC bias or voltage (0 to 10 volts) is applied to electrodes 40, 42, 46, 48, 50, and 52 while skimmer cone 33 is grounded. Due to the potential difference between electrode 40 and skimmer 33, the velocity of the ions within beam 28 is reduced before they enter beam modulation assembly 16. In this operating mode, the duty cycle increases because of the decreasing ion velocity, v, and the detection sensitivity of the mass spectrometer 10 increases correspondingly.

If the length of the modulated ion packets is longer than the distance, b, between electrodes 50 and 52, the duty cycle increases accordingly. However, all the ions must be held in the extraction region 51 between electrodes 50 and 52 before they are extracted by applying pulse $V_2$ as shown in FIG. 5. In this mode, skimmer cone 33 and extraction electrode 50 are grounded before an extraction pulse $V_2$ is applied, and a positive DC voltage is applied to electrode 52. The ion packet will then be slowed down between electrodes 50 and 52 and stored in this region. To avoid the penetration of ions from the storage region, the voltage or bias applied to electrode 52 must be slightly higher than the ratio of the maximum kinetic energy of the ions before extraction to the ion charge of the ions (K/q) but not significantly higher because the ions would then be reflected backwards. Using this technique, the duty cycle, and thus the sensitivity of the time-of-flight mass spectrometer, is further improved.

Illustrated in FIG. 6 is an alternate embodiment of the time-of-flight mass spectrometer substantially similar in all respects to that described above including having the capability of removing select ions from the drift region so they are not detected or analyzed. This second and more preferred embodiment 110 of the time-of-flight mass spectrometer includes a housing 112 which contains an ion optics assembly 113 having a sampling assembly generally indicated as 114, an ion collimating assembly 136, a beam modulation assembly 116, and an ion packet extraction assembly 118. Attached to an end of assembly 113 is an analyzer assembly 120. All of the components are disposed in line with each other along longitudinal axis 122. Disposed at one end of the mass spectrometer is an ion source 124, which provides the sample to be analyzed. Also coupled to the mass spectrometer 110 is a vacuum source 126 which draws down the pressure in the mass spectrometer in stages to approximately $1.0 \times 10^{-6}$ torr as described above.

The sampling assembly 114 includes a sampling cone 130 having a conical portion 131 and a perforated tip 132 oriented toward the ion source. Adjacent sampling cone 130 is a skimmer cone 133 and a conical portion 134, with an aperture 135 located at the tip. Skimmer cone 133 and sampling cone 130 are oriented in the same direction, preferably with the cones pointed toward the ion source 124 and such that the apertures are located along axis 122. Disposed toward the interior of mass spectrometer 110 and adjacent skimmer cone 130 is ion collimating assembly 136, consisting of a plurality of rings or electrode disks 136a, 136b, and 136c, each concentric about axis 122. As ion source 124 produces ions which are drawn from the source under a pressure differential through the apertures 132, 135 in the sampling cone and skimmer cone 130, 133, respectively, at a supersonic velocity to form a continuous beam of ions, the beam passes through each of the electrode disks 136a–136c to form a collimated beam as a result of the electrical fields produced by a combination of the electrode disks.

Adjacent sampling assembly 114 is beam modulation assembly 116 defined by a pair of beam cross-section limiter electrodes 140, 142, each having an aperature 144a, 144b, respectively, aligned with axis 122, and the sampling assembly 114. Disposed between electrodes 140, 142 and oriented parallel to axis 122 are a pair of deflection electrode plates 146, 148. It is preferred that the electrode plates 146, 148 are spaced substantially equally from axis 122 and oriented parallel to each other. The continuous beam of ions collimated by electrode disks 136a–136c pass through aperture 144a into beam modulation assembly 116. A positive bias applied to electrode 146 or 148 causes the positively charged collimated beam of ions to deflect from their travel path along axis 122 and away from aperture 144b so as to impact electrode 142. At periodic intervals, the beam of ions is allowed to pass through aperture 144b by removing the bias on either of the electrodes 146, 148. At the end of the desired time interval, the bias is reapplied to either one of the electrodes to deflect the beam away from aperture 144b. Additionally, the cross-sectional dimension of the ion beam may be controlled by the diameter of apertures 144a, 144b as described above. It is desirable to restrict the cross-sectional dimension of the ion beam as much as possible. To achieve this end, apertures 144a, 144b do not need to be the same size.

Adjacent beam modulation assembly 116 and spaced therefrom by a predetermined distance is ion packet extraction assembly 118, including at least two, and preferably three, electrodes such as 150, 152, and 154, each having an aperture 156a, 156b, and 156c, respectively, aligned with each other and concentrically disposed along axis 122. Each of the apertures 156a, 156b, and 156c may be filled with a wire mesh, grid, screen, or lattice 158 to continue the electrical field across the aperture as the result of any bias applied to any one of the electrode plates. The spacing between electrode plates 142, 150, 152, and 154 is controlled by the same variables described above with respect to FIGS. 3 and 4.

Forming the end of mass spectrometer 110 opposite ion source 124 is the analyzer assembly 120. Assembly 120 includes a flight tube 160 closed at a first end 162 by electrode plate 154 and at an opposite end 164 by plate 166. Extending into the interior of flight tube 160 from plate 166 is an ion detector 168, which is aligned with and disposed along axis 122. Detector 168 is preferably a microchannel plate detector, although an SEM may also be used.

Contained within flight tube 160 and located more toward electrode 154 than ion detector 168 is at least one, and preferably two, ion deflection plates 182, 184, each disposed opposite the other and spaced equidistantly from axis 122. By applying a positive bias to either electrode 182 or 184 through their respective conductors 186, 188, ions within the ion beam drifting along axis 122 within the flight tube 160 can be deflected away from detector 168. Particular ion species can be removed from the ion sample based on the relationship of the size of the ion and calculating the instant that particular ion would be substantially between the deflector plates. At that instant, the bias may be applied to either one of the plates to cause that particular ion species to be deflected from the flight path 122.

To assist in the deflection of the particular ion species, and to better organize the ion species along a flight path, an ion lens assembly 170 is placed between the ion extraction assembly 118 and the ion deflection plates 182, 184. The ion lens assembly 170 is preferably arranged co-axially with the ion extraction assembly 118. The distances between the lens assembly 170 and the extraction assembly 118, and between the lens assembly 170 and the deflection plates 182, 184 is not important. In a preferred embodiment, the ion lens assembly 70 is an einzel lens which includes three rotationally symmetric electrodes arranged generally equidistantly from either other. The electrodes can be disc-like plates or cylindrical electrodes. The outer and inner diameter and thickness of the electrodes can be varied and need not be the same for all three electrodes. However, the minimum aperture of the lens assembly 170 (determined by the smallest inner diameter of electrodes) should generally be at least twice that of the aperture 156c in the last electrode of the extraction assembly 118.

During the operation, both end electrodes are connected to the same voltage, usually, to the voltage of the flight tube. The voltage of flight to the mid-electrode may be either higher or lower than that of the end electrodes. Both the positive and negative lenses are focusing lenses. For a high resolution time-of-flight mass spectrometer, a negative lens is typically used. The voltage of the mid-electrode is determined by the ion end energy in the flight path in combination with the type of ion deflector being used.

A third embodiment 210 of the mass spectrometer, as shown in FIG. 7, operates in a reflection mode. The mass spectrometer 210 includes a housing 212 for retaining a sampling assembly 214, a beam modulation assembly 216, and an ion packet extraction assembly 218, all comprising the ion optics assembly 213 as described above. An analyzer assembly 220 extends from the end of assembly 213. Sampling assembly 214 comprises a sampling cone 230, a skimmer cone 233, and a plurality of ion lenses 236a, 236b, and 236c, all disposed adjacent each other and concentric with an axis 222. The sampling cone 230 and skimmer cone 233 each contain a cone portion 231, 234, respectively, and are oriented toward ion source 224. The tips of each cone 231, 234 have an aperture 232, 235 defined at the cone apex, located along the axis 222. Disposed at one end of the sampling assembly 214 opposite ionic source 224 is beam modulation assembly 216. Assembly 216 includes a pair of ion beam cross-section limiter electrodes 240, 242 at opposite ends of a pair of beam deflection electrodes or plates 244, 246. Disposed between ion beam modulation assembly 216 and analyzer assembly 220 is the ion packet extraction assembly 218, which includes at least two, and preferably three, electrodes 250, 252, and 254. Electrode plates 240, 242, 250, and 252 each have a central aperture extending therethrough which are concentric with longitudinal axis 222. Likewise, deflection plates 244, 246 are disposed opposite each other about axis 222, spaced equidistantly therefrom. All of the components between sampling cone 230 and ion packet extraction electrode 252 have the same configuration and relative spacing as the components shown in FIGS. 3, 4, and 5.

Ion packet extraction electrode 254 is substantially larger than either of the electrodes 250, 252 in the ion packet extraction assembly 218 because electrode 254 closes one end of flight tube 260, which is substantially greater in diameter than the portion of housing 212 containing ion optics assembly 213. An aperture 256c extends through electrode 254, which is concentric with axis 222, but offset from the center C of the electrode plate 254. Disposed within flight tube 260 and spaced from electrode plate 254, are a pair of deflection plates 282, 284 substantially identical to those described above and shown in FIG. 6. The deflector plates 282, 284 are suspended within the flight tube 260 opposite each other and substantially equidistant from axis 222 passing through aperture 256c. Located between the deflector plates 282, 284 and electroplate 254 is the einzel lens 270. As in the prior embodiments, the einzel lens 270 is arranged co-axially with the axis 222. Also, as in the previous embodiments, the distance between the lens assembly 270, the extraction assembly 218, and the deflection electrodes 282, 284, is not important. The electrode shapes and polarities may be similar to that described above.

In line with axis C and extending inwardly of flight tube 260 from end plate 266 is a reflectron generally indicated as 289. Reflectron 289 may have a number of configurations, but generally includes a number of electrodes 290 spaced from each other along a suitable receiving axis (not shown). Each electrode 290 is generally in the shape of a planer disk electrically coupled in parallel to a power source 294 through a cascade of resistors 296. In this configuration, the electrical potential produced by the plurality of electrodes 290 increases in strength from electrode 290a toward 290e closest to end plate 266. Thus, a voltage provided by source 294 to electrode 290a would need to pass through resistors 296a, 296b, 296c, and 296d. A voltage applied to electrode 290b would need to pass through one less resistor which, in turn, would result in a greater voltage applied to electrode 290b and, thus, result in a higher or greater voltage. The reflectron 289 would be oriented with respect to axis C such that any particles traveling along axis 222 would be reflected by the electric fields generated by reflectron 289 along a path toward detector 268 disposed on electrode 254 on a side of point C opposite aperture 256c.

Figure 2:
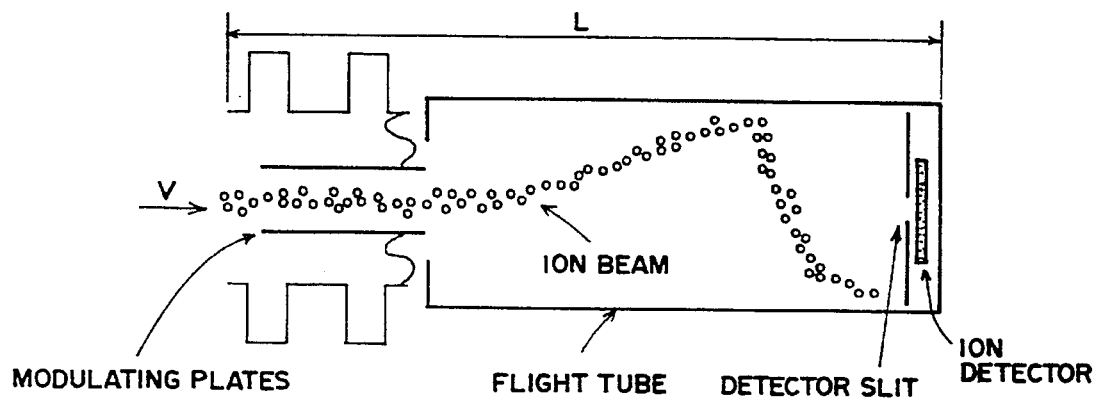
FIG. 2 is a schematic diagram of an on-axis time-of-flight mass spectrometer according to BAKKER.

In operation of the mass spectrometer 210 shown in FIG. 7, the ions are sampled from source 224 in the same fashion as the embodiments shown in FIGS. 3, 4, and 6 to produce the continuous ion beam which is modulated by ion beam modulation assembly 216 to produce the collimated ion packets. Each of these ion packets is then extracted and accelerated into the flight tube 260 and space-focused in the same fashion by electrodes 250, 252, and 254. As the ion packets drift through the flight tube 260, they enter the electric field produced by reflectron 289. Ions of similar mass having a higher kinetic energy penetrate deeper into the electric field than ions having a lower kinetic energy. However, because the electric potentials are higher further within the reflectron, all of the ions are repulsed from the reflectron toward the detector 268 so as to arrive at substantially the same instant and time. The time error caused by the initial energy spread in the ion packet is compensated by using the ion reflectron so that the mass resolving power in this mode is higher than in the linear mode as shown in FIGS. 3, 4, and 6. The use of a reflectron in a right angle or orthogonal time-of-flight mass spectrometer is not optimal, since the cross section of the ion packets is very wide. Only a small portion of the ions can be reflected to the detector, and as a result the transmission efficiency is low. In conventional on-axis time-of-flight mass spectrometers such as described in FIG. 2, application of an ion reflector is not possible due to the beam sweeping. In the mass spectrometer of this invention 210, the cross section of the ion packets is very narrow so that substantially all of the ions penetrate the reflectron field along a stable flight path so that maximum reflection of all the ions occurs toward the detector.

In the embodiments shown in FIGS. 6 and 7, both illustrate the use of deflection plates for removing undesirable ions from the flight path. For example, one often desires to remove plasma-gas ions before they reach the detector. The concentration of these ions is very high. If they hit the ion detector, it can become saturated and unable to detect analyte ions for a period. A simple method to remove these ions is through the so-called "deflection plates" 182, 184, and 282, 284, shown in FIGS. 6 and 7 respectively. The ions to be removed can be deflected from their original flight path by applying an electrical pulse, such as $V_3$, shown in FIG. 5, while these ions are passing through the region between the electrodes. Since the cross section of the ion packets is small and the ion path is stable, they can be substantially deflected from the ion detector. In comparison, the deflecting efficiency in the right-angle time-of-flight mass spectrometer is low because of a large cross section of the ion packets. In the conventional on-axis mass spectrometer shown in FIG. 2, this deflection method cannot work because the ions do not have a stable flight path.

The ions analyzed are produced from a sample using any one of a number of methods including electrospray ionization, DC or radio-frequency glow discharge ionization, and inductively-coupled plasma ionization. The ions are drawn into the ion optics assembly under vacuum. The ions pass through the aperture formed in the sampling cone, through the first chamber, and through the aperture in the skimmer cone into the second chamber. The ions enter these two chambers at a supersonic velocity as a result of the significant decrease in pressure from atmospheric-pressure at the sample to $1.0 \times 10^{-3}$ torr in the second chamber. From the second chamber, the ions from the sample 24 pass through yet another aperture into the third chamber pumped down to a pressure of $1.0 \times 10^{-6}$ torr. The third chamber includes a plurality of electrodes, each receiving a different voltage so as to produce electric fields for collimating the ions into a tightly knit, continuous beam of ions. The continuous beam of ions collimated by the cascade arrangement of the electrodes passes through the first of at least two ion beam cross-section limiter plates forming the beam modulation assembly. A pair of beam modulation plates are charged so as to deflect the ion beam from the travel path and prevent the ions from passing through a second aperture at the opposite end of the beam modulation assembly and impact upon the second beam cross-section limiter plate. At a predetermined instant in time, and for a predetermined interval, the potentials applied to the electrodes in the beam modulation assemblies are removed so that the region between the electrodes is field free. At this instant, the ion beam does not experience any electrical force and, thus, is not deflected and allowed to pass through the aperture in the second beam cross-section limiter plate. It is preferred that the opening of the aperture in the second cross-section limiter plate is smaller than that existing in the first limiter plate so as to further restrict the cross-sectional dimension of the ion beam passing therethrough. At the end of the interval, the potential differences are again applied to the electrodes in the beam modulation assembly, and the beam is deflected from the flight path, resulting in the production of an ion packet. The ion packet produced by the beam modulation assembly passes through an aperture on a first electrode into an extraction region defined by the first and second electrodes. At this particular instant in time, the extraction region between the two electrodes is field free. When all of the ions in the ion packet are within the extraction region a positive bias or voltage is passed to the first electrode so that the ions of like charge are repelled from the first electrode through a similar aperture formed in the second electrode. The time at which the extraction pulse is applied to the repelling electrode is dependent on the distance between the repelling electrode and the second beam-cross-section limiter plate. The repelling pulse applied to the electrode of the extraction region is applied at a particular time delay after the modulation pulse in the beam modulation assembly switched to zero. It is preferred that a third electrode is provided adjacent the second electrode defining the extraction region, and on an opposite side from the repelling electrode. The third electrode preferably is at a negative potential and defines an acceleration region with the second electrode. It is also preferred to add at least one and preferably a plurality of additional electrodes into the region between the second and third electrodes. These electrodes possess a similar shape as the second and third electrodes but preferably a larger aperture. They are generally referred to as "guard electrodes" and are equidistantly disposed between the second and third electrodes and concentric with them. The function of these guard electrodes is to keep the electrical field between the second and third electrodes homogeneous and also to prevent this field from being affected by the potential on the surrounding vacuum chamber. Over the potential drop provided by the repelling electrode and the third electrode, the ion packets are accelerated through an aperture in the third electrode into the flight tube with their final kinetic energy.

The duty cycle of this mass spectrometer is improved from that achieved by orthogonal-axis and conventional on-axis mass spectrometers by applying a small, positive DC bias or voltage within the range of 0 and 10 volts to all of the electrodes comprising the beam modulation assembly and the first and second extraction electrodes, while the skimmer cone is grounded. Due to the potential difference between these electrodes, the velocity of the ions therebetween is reduced before the ions enter the beam modulation assembly. Thus, in essence, the ions in the beam modulation assembly become more compact resulting in more ions in a particular segment of the ion beam. This concentration of ions is maintained when the beam is modulated to produce the ion packet.

The duty cycle is also increased by increasing the length of the modulated ion packet. However, to maintain this increase in duty cycle, the longer packet of ions should be within the extraction region between the two extraction electrodes. To achieve this, the skimmer cone and the first extraction electrode are grounded prior to application of the extraction pulse. A positive DC voltage is applied to the second extraction electrode, which causes the ion packet entering therein to be slowed down and stored within the beam modulation assembly. This is achieved by applying a voltage or bias to the second extraction electrode which is slightly higher than the ratio of the maximum kinetic energy of the ions before extraction (K) to the ion charge (q), but not so high as to reflect the ions and reverse direction.

The tightly concentrated ion packet of a specific length also has a stable flight path in the drift region of the analyzer assembly. Therefore, an ion lens can be used for further lateral focusing of the ion packets onto the ion detector. Ion losses caused by whatever slight beam divergence exists is further reduced. Consequently, the transmission efficiency and thus the sensitivity of the time-of-flight mass spectrometer are significantly increased. As a result of the stable flight path, and as a result of the space focusing achieved by the extraction electrodes, substantially all of the ions within the packet of the same mass reach the detector at substantially the same time. The stable flight path of the ions reduces the background noise, and the removal of the matrix ions by the deflection plates within the analyzer all result in an improved signal-to-noise ratio and a mass resolving power not achieved previously in time-of-flight mass spectrometers.

The resolving power of the linear time-of-flight mass spectrometer is dependent upon the length of the ion packets if the parameters b, c, d, and l are fixed. Since the length of the ion packets is determined by the switch-on time, $t_1$, of the modulation pulse $V_1$ (see FIGS. 4 and 5) on the deflector plate 46, the resolving power can be changed by changing $t_1$. The shorter the ion packets, the higher will be the mass resolving power. However, shorter ion packets mean a reduced duty cycle and, therefore, a lower sensitivity. Therefore, this operating mode will be used only in situations when a higher mass resolving power is required for overcoming isobaric spectral overlaps. Changing the mass resolving power without changing the geometrical design is possible in this configuration, unlike in orthogonal time-of-flight mass spectrometers or in conventional axial time-of-flight mass spectrometers described above. In both of these earlier configurations, some ion-optical elements must be changed to enable manipulation of the mass resolving power.

Figure 8:
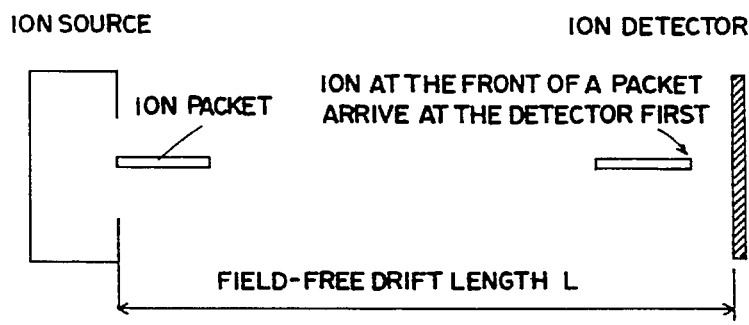
FIG. 8 is a schematic diagram of arrival times of ions in a mono-energetic ion packet.
Figure 9:
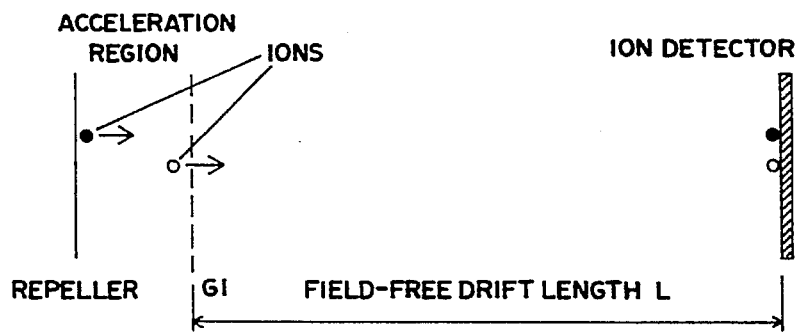
FIG. 9 is a schematic diagram illustrating travel times of ions having different kinetic energies.

As mentioned above, the ion packets produced by the beam modulation assembly have a certain length. When an ion packet, in which all the ions are assumed to possess the same kinetic energy, is sent into the field-free drift region in flight tube 60, one can easily imagine that the ions at the front of the packet will arrive at the detector first and those ions at the rear of the packet will arrive later (see FIG. 8). Therefore, the length of the ion packets cause an undesirable time error in the time-of-flight mass spectrometer. However, if ion packets are sent from an appropriately designed acceleration field as shown in FIG. 9, the time error caused by the length of the ion packets can be reduced. Obviously, the ions at the rear of the packet will gain a higher kinetic energy so that they are able to catch the ions at the front at a certain distance downstream from the acceleration field. The ion packets are, therefore, "bunched" or "space-focused." Consequently, the length of the ion packets at the detector plate is decreased and the time error reduced correspondingly.

Unfortunately, in practice it is difficult to reduce the length of the ion packets to zero. This is because the position of the ions in the acceleration field will be related to the kinetic energy ($K_E$) they gain and not to their final velocity (proportional to $(K_E)^{1/2}$). A better design for achieving space focusing employs the two-step acceleration device schematically shown in FIG. 10. By appropriately choosing parameters with this design, time errors related not only to the linear term in the initial position of an ion packet but also to the square term can be eliminated. Therefore, higher mass resolving power can be attained with such a two-step ion acceleration device. Generally, we refer to the elimination of the linear dependence as "first-order space focusing" and to the elimination of both linear and squared dependencies as "second-order space focusing."

Figure 10:
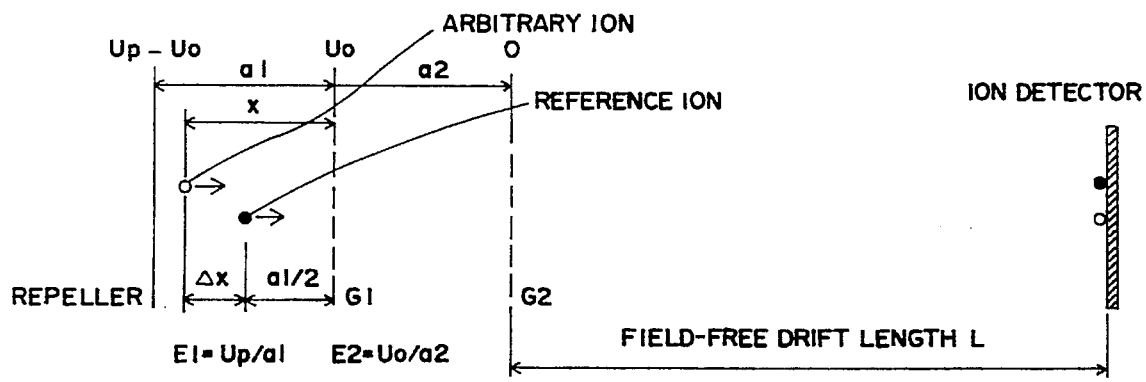
FIG. 10 is a schematic diagram illustrating a two-step acceleration device.

In a linear time-of-flight mass spectrometer, ion packets are usually space-focused onto the detector under conditions of first-order space focusing. To meet this condition, the ion detector 68 or 168 must be placed at a distance L from electrode 54 or 154 as shown in FIGS. 3, 6, and 10. This distance L is determined by the expression:

$$L = a_1 \left[ \left(1 - \frac{g}{f}\right)(1 + 2f)^{\frac{3}{2}} + g\left(2 + \frac{1}{f}\right) \right] \quad (8)$$

with $$g = \frac{a_2}{a_1} \quad f = \frac{U_0}{U_p}$$

where $a_1$ and $a_2$ represent the length of extraction region 51 and the length of acceleration region 53, and $U_p$ and $U_o$ the voltage drop over these regions, respectively.

For a time-of-flight mass spectrometer using an ion reflector 209 (see FIG. 7), all ions of the same mass are preferably focused in the second order into a short bunch at a small distance L, downstream from electrode 254. This will be the location where $L=a_1+2a_2$. This focused ion packet is then refocused at the detector surface 256c.

This short ion packet will then be rebuilt at the focal plane of the detector by the ion reflector 289 (FIG. 7). The time error caused by the initial ion-energy distribution will be compensated by choosing an appropriate potential distribution in reflectron 289. In this way, high mass resolving power can be achieved, even for ions that possess a range of initial kinetic energies.

In addition, undesired ion packets (i.e., Ar+) can be selectively deflected more efficiently with this design. At the initial second-order space-focusing point (before reflectron 289) isomass ion packets are bunched together in as short a pocket as possible, and the ions of different mass are separated in time. This is an especially useful location to remove masses which may saturate the ion detectors.

The advantages produced by this invention include a higher signal-to-noise ratio as a result of slowing down the ion packets before extraction, and extending the extraction region which was not feasible heretofore in right-angle (orthogonal) time-of-flight mass spectrometers. Additionally, the small ion beam cross section and the increased effectiveness of the focusing lenses in the ion-optic assembly results in a small angular divergence of the ion beam and thus a higher transmission efficiency (approaching 100 percent) in the time-of-flight analyzer tube. Background noise is also reduced since the ion injection is inherently pulsed. The mass resolution of the spectrometer is at least equal to and even greater than that achieved in prior art devices. Under conditions of space and energy focusing, mass resolution is dependent upon the ratio of the length of the modulated ion packet and the length of the extraction region. This ratio can be easily adjusted by changing the modulation time. The kinetic energy spread, once used as a justification for the right-angle time-of-flight mass spectrometer geometry, is compensated in this invention by the ion reflectron.

Yet another advantage is the lower mass bias and consequently simpler simultaneous multi-mass detection achieved because the ions are extracted in the direction of the supersonic continuous ion beam. As a result, no mass-dependent displacement occurs in the detector plane. Substantially simultaneous detection is, therefore, possible without resorting to a ramping voltage on the steering or deflection plates, such as 282, 284 (FIG. 7), upstream of the detector. Still another advantage produced as a result of the stable flight path of the collimated ion packet is that ion reflectron performance is increased. This performance is also the result of a small angular divergence of the beam. These factors translate into higher ion transmission and instrument-design flexibility.

The flexibility and choice of the ion detector is another advantage. Either a microchannel plate detector or a discrete-dynode SEM can be used. In the conventional orthogonal time-of-flight systems, the large cross section of the ion beam makes it difficult to use the SEM detectors since such detectors cannot ordinarily be fabricated with a large active detection surface. When the detection surface area increases, transit-time spread from different points on the detector surface degrades time resolution to an unacceptable degree. Significantly, use of an SEM as an ion detector for time-of-flight mass spectrometers is especially advantageous for glow discharge time-of-flight mass spectrometers. In such spectrometers, significant signal levels for elements can paralyze a microchannel plate detector or any continuous-dynode multiplier. The SEM is far less susceptible to paralysis.

A further advantage of this invention is the addition of the deflection plates used to remove matrix ions from the ion packets. The matrix ions, such as argon and base materials in a solid sample, can be removed more efficiently by using the post-deflection of the smaller input beam diameter.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A time-of-flight mass spectrometer, comprising:

an ion source producing a continuous beam of ions:

a beam modulation assembly for generating at least one packet of ions from the continuous beam of ions; and an extraction assembly downstream and spaced from said beam modulation assembly and said ion source for accelerating said packet of ions, into a flight tube along a flight path, said ion source, beam modulation assembly, and extraction assembly disposed along a common axis.

2. The mass spectrometer as defined in claim 1, further comprising an ion lens assembly spaced from said extraction assembly, for concentrating said ion packet along said flight path.

3. The mass spectrometer as defined in claim 2, further comprising a deflection assembly spaced from said beam modulation assembly, said extraction assembly, and said ion lens assembly, for deflecting predetermined components from said ion packet out of said flight path.

4. The mass spectrometer as defined in claim 3, wherein said beam modulation, extraction, ion lens, and deflection assemblies are disposed along, said common axis.

5. The mass spectrometer as defined in claim 4, wherein said deflection assembly is disposed within said flight tube along said common axis.

6. The mass spectrometer as defined in claim 5, further comprising a detector disposed at one end of said flight tube for detecting components of said ion packet.

7. The mass spectrometer as defined in claim 6, wherein said detector is disposed along said common axis with said beam modulation, extraction, focusing, and deflection assemblies.

8. The mass spectrometer as defined in claim 6, wherein said detector is off-axis from said common axis and is disposed at an opposite end of said flight tube.

9. The mass spectrometer as defined in claim 8, further comprising a reflector assembly disposed at one end of said flight tube opposite said detector and along said common axis with said flight tube for reflecting components of said packet toward said detector.

10. The mass spectrometer as defined in claim 6, further comprising:

an assembly for producing an analyte;

an assembly adjacent said producing assembly for accelerating samples of said analyte along said common axis; and an assembly for generally collimating said analyte along said common axis before entering said beam modulation assembly.

11. The mass spectrometer as defined in claim 6, wherein said ion detector is spaced a predetermined distance from said extraction assembly, said distance corresponding to a focal point for components of similar mass-to-charge ratio forming said ion packet.

12. The mass spectrometer as defined in claim 4, wherein said extraction assembly includes at least two electrode plates, generally perpendicular to said common axis, distanced from each other and having an aperature aligned along said common axis.

13. The mass spectrometer as defined in claim 12, wherein said beam modulation assembly produces said ion packet having a length longer than the distance between said at least two electrode plates for increasing the duty cycle of said mass spectrometer.

14. The mass spectrometer as defined in claim 12, wherein said beam modulation assembly produces said ion packet having a length shorter than the distance between said at least two electrode plates for increasing the mass resolving power of said mass spectrometer.

15. The mass spectrometer as defined in claim 12, wherein said at least two electrode plates receive different electrical potentials to store said ion packet in the space between said electrode plates.

16. The mass spectrometer as defined in claim 4, wherein said extraction assembly includes a plurality of electrode plates spaced from each other, and each having an aperture aligned along said common axis.

17. The mass spectrometer as defined in claim 16, wherein said each of said electrode plates includes an electrode mesh spanning said aperture.

18. The mass spectrometer as defined in claim 4, wherein said deflection assembly includes at least two deflection electrodes oriented orthogonal to said extraction assembly, and each selectively receiving a potential to create a field about one or more select components forming said packet and deflecting said components from said flight path.

19. The mass spectrometer as defined in claim 18, wherein said deflection electrodes are spaced a predetermined distance from said extraction assembly corresponding to a focal point for similar components forming said packet.

20. The mass spectrometer as defined in claim 19, wherein said focal point includes at least one of a first-order and a second-order focal point.

21. The mass spectrometer as defined in claim 10, wherein said flight tube is parallel to and in-line with said common axis of beam modulation, sampling, and ion packet extraction and focusing assemblies.

22. The mass spectrometer as defined in claim 1, wherein said beam modulation assembly includes:
   at least one plate having an aperture therein for limiting a cross-sectional area of said beam; and
   an electrode assembly generally orthogonal to said at least one plate for selectively producing a field to deflect said beam and prevent it from passing through said aperture in said plate.

23. The mass spectrometer as defined in claim 22, further including a second plate having an aperture therein aligned with said aperture in said at least one plate for limiting a cross-sectional area of said beam to pass therethrough into said electrode assembly.

24. The mass spectrometer as defined in claim 23, wherein said first plate also decelerates said beam prior to entering said electrode assembly to increase the duty cycle of said mass spectrometer.

25. A time-of-flight mass spectrometer, comprising:
   a first assembly for producing a continuous beam of ions;
   a second assembly downstream of said first assembly for producing an ion packet from said continuous beam of ions, said ion packet having a predetermined length and a cross-sectional area equal to or less than said beam of ions;
   a third assembly downstream of said second assembly for accelerating said ion packet along a flight path generally parallel to said continuous beam of ions; and
   a fourth assembly having at least one ion detector for receiving and detecting said ions within said ion packet.

26. The mass spectrometer as defined in claim 25, wherein said fourth assembly further includes an electrode assembly for focusing said ion packet in a direction transverse to said flight path.

27. The mass spectrometer as defined in claim 25, wherein said ion detector is disposed at a point where first-order space focusing occurs.

28. The mass spectrometer as defined in claim 25, wherein said ion detector is disposed at a point where second-order space focusing occurs.

29. The mass spectrometer as defined in claim 25, wherein said fourth assembly further includes an electrode assembly for selectively deflecting certain ions in said ion packet from said flight path so as not to be received or detected by said ion detector.

30. The mass spectrometer as defined in claim 29, wherein said electrode assembly is disposed at a point where first order focusing occurs.

31. The mass spectrometer as defined in claim 29, wherein said electrode assembly is disposed at a point where second-order focusing occurs.

32. The mass spectrometer as defined in claim 25, wherein said fourth assembly further includes a reflector assembly.

33. The mass spectrometer as defined in claim 25, wherein said first assembly includes:
   a sampling assembly for drawing ions from an ion producing source; and
   at least one electrode within said sampling assembly for generating an electrical field to focus ions therein into said continuous beam.

34. The mass spectrometer as defined in claim 25, wherein said second assembly includes:
   a beam modulation assembly coupled to said first assembly and including at least one beam cross-section limiter plate having an aperture defined therein for controlling a cross-sectional profile of said continuous beam of ions; and
   an electrode assembly adjacent said at least one beam cross-section limiter plate for sweeping said continuous beam of ions across said aperture in said beam cross-section limiter plate in a predetermined time interval to produce a packet of ions passed to said third assembly.

35. The mass spectrometer as defined in claim 25, wherein said third assembly includes:
   an extraction assembly adjacent said second assembly and including a plurality of electrodes spaced from each other and from said second assembly by a predetermined distance, each electrode having an aperture therein aligned with said continuous beam of ions, for receiving and extracting said ion packet, and accelerating said ion packet along a flight path into said fourth assembly.

36. The mass spectrometer as defined in claim 25, wherein said second assembly produces said ion packet in a manner increasing the mass resolving power of said mass spectrometer.

37. The mass spectrometer as defined in claim 25, wherein said second assembly produces said ion packet in a manner for increasing a duty cycle of said mass spectrometer.

38. The mass spectrometer as defined in claim 25, wherein said first assembly decelerates said beam of ions prior to entering said second assembly to increase a duty cycle of said mass spectrometer.

39. The mass spectrometer as defined in claim 35, wherein said plurality of electrodes of said extraction assembly receive opposite electrical potentials to store said ion packet therebetween.

40. A method for increasing sensitivity, speed of analysis, resolving power, and signal-to-noise ratio of a time-of-flight mass spectrometer used in isotopic, molecular, and elemental analysis, comprising the steps of:
   generating a generally continuous beam of ions;
   decelerating said generally continuous beam of ions;
   producing a packet of ions from said decelerated, generally continuous beam of ions at a first position; and
   accelerating said ion packet at a second position downstream and spaced from said first position into an electrical-field-free mass analyzer generally parallel to the direction of propagation of said ion packet.

41. The method as recited in claim 40, wherein the step of producing a packet of ions includes modulating said generally continuous beam of ions using an electromagnetic field and allowing said generally continuous beam of ions to pass through an opening for an interval of time.

42. The method as recited in claim 40, wherein the step of producing a packet of ions includes modulating said generally continuous beam of ions using an electrical field and allowing said generally continuous beam of ions to pass through an opening for an interval of time.

43. The method as recited in claim 40, wherein the step of decelerating said continuous beam of ions includes applying a potential along a predetermined portion of said generally continuous beam of ions.

44. The method as recited in claim 43, wherein the step of generating a generally continuous beam of ions includes:
   ionizing a sample to produce ions;

drawing said ions into a suitable chamber; and collimating said ions into said generally continuous beam of ions by passing said ions through an ion lens.

45. The method as recited in claim 44, wherein the step of collimating said ions into said generally continuous beam further includes passing said ions from said ion optic lens through an aperture of predetermined size formed in at least one beam cross-section limiter plate.

46. The method as recited in claim 40, wherein the step of accelerating said ion packet includes:

passing said ion packet into an extraction region defined between a first pair of electrodes, each having an aperture of predetermined size aligned with said generally continuous beam of ions; and applying a potential across said pair of electrodes and repelling said ion packet into a field-free analyzer through an accelerating region defined between a second pair of electrodes spaced from said first pair of electrodes.

47. The method as recited in claim 46, further comprising applying a bias to one of said first pair of electrodes while said ion packet enters said extraction region to temporarily store said ion packet in said extraction region prior to accelerating, wherein said DC voltage is slightly higher than a ratio of a maximum kinetic energy and an ion charge of said ions.

48. The method as recited in claim 40, further comprising:

spatially focusing ions of similar mass within said ion packet to arrive at a predetermined point within said field-free analyzer at generally one instant in time; and deflecting predetermined ones of said ions of similar mass from said field-free analyzer so as not to be detected by the mass spectrometer.

49. The method as recited in claim 40, further including storing said ion packet in an extraction assembly prior to the step of accelerating said ion packet.

50. The method as recited in claim 40, further including increasing a duty cycle of said mass spectrometer by producing said packet of ions with a length greater than a distance between electrode plates used to accelerate said ion packet.

51. The method as recited in claim 40, further including producing said ion packet with a length lesser than a distance between electrodes used to accelerate said ion packet.

52. The method as recited in claim 40, further including focussing said ion packet within said electrical-field-free mass analyzer along a predetermined axis.

53. The method as recited in claim 40, further including detecting said ion packet at one end of said mass analyzer.

54. The method as recited in claim 53, further including reflecting said ion packet at one end of said mass analyzer to a detector.

55. The method as recited in claim 53, further including detecting said ion packet at one of a first- and second-order spatial focusing point.

56. A time-of-flight mass spectrometer, comprising:

a beam modulation assembly for generating at least one packet of ions from a continuous beam;

an extraction assembly spaced downstream from said beam modulation assembly for accelerating said packet into a flight tube along a flight path;

an ion lens assembly spaced from said extraction assembly, for concentrating said ion packet along said flight path, said flight path having at least one of a first and second order spatial focal point; and an ion deflector assembly spaced from said beam modulation assembly, said extraction assembly, and said ion lens assembly, and located at one of said first and second order spatial focusing points.

57. A time-of-flight mass spectrometer, comprising:

a beam modulation assembly for generating at least one packet of ions from a continuous beam;

an extraction assembly spaced downstream from said beam modulation assembly for accelerating said packet into a flight tube along a flight path;

an ion lens assembly spaced from said extraction assembly, for concentrating said ion packet along said flight path;

a deflection assembly spaced from said beam modulation assembly, said extraction assembly, and said ion lens assembly, for deflecting predetermined components from said ion packet out of said flight path;

a detector disposed at one end of said flight tube for detecting components of said ion packet;

an assembly for producing an analyte upstream from said beam modulation assembly;

an assembly adjacent said producing assembly for accelerating samples of said analyte along said common axis; and an assembly for generally collimating said analyte along said common axis prior to entering said beam modulation assembly, wherein said beam modulation, extraction, ion lens, and deflection assemblies are disposed along a common axis, and said deflection assembly is disposed within said flight tube along said common axis.

58. A time-of-flight mass spectrometer, comprising:

a beam modulation assembly for generating at least one packet of ions from a continuous beam, said beam modulation assembly having at least one plate with an aperture therein for limiting a cross-sectional area of said beam, and an electrode assembly generally orthogonal to said at least one plate for selectively producing a field to deflect said beam and prevent it from passing through said aperture in said plate; and an extraction assembly spaced downstream from said beam modulation assembly for accelerating said packet into a flight tube along the flight path.

59. A time-of-flight mass spectrometer, comprising:

a beam modulation assembly for generating at least one packet of ions from a continuous beam of ions;

an extraction assembly spaced downstream from said beam modulation assembly for accelerating said packet of ions along a flight path into a flight tube, said extraction assembly having at least two electrode plates oriented generally perpendicular to said continuous beam, distanced from each other, and each having an aperture aligned with said continuous beam;

an ion lens assembly spaced downstream from said extraction assembly, for concentrating said ion packet along said flight path; and a deflection assembly downstream from said beam modulation assembly, said extraction assembly, and said ion lens assembly, for deflecting predetermined components from said ion packet out of said flight path, said beam modulation, extraction, ion lens, and deflection assemblies disposed along a common axis.

60. A time-of-flight mass spectrometer, comprising:

a beam modulation assembly for generating at least one packet of ions from a continuous beam of ions;

an extraction assembly downstream from said beam modulation assembly for accelerating said packet along a flight path, said extraction assembly having a plurality of electrode plates spaced from each other, and each having an aperture aligned with said continuous beam of electrons;

an ion lens assembly downstream from said extraction assembly, for concentrating said ion packet along said flight path; and a deflection assembly downstream from said ion lens assembly, for deflecting predetermined components from said ion packet out of said flight path, said beam modulation, extraction, ion lens, and deflection assemblies disposed along a common axis.

61. A time-of-flight mass spectrometer, comprising:

a beam modulation assembly for generating at least one packet of ions from a continuous beam of ions;

an extraction assembly spaced from said beam modulation assembly for accelerating said at least one packet of ions along a flight path, said extraction assembly having at least two electrode plates, generally perpendicular to said flight path, distanced from each other and having an aperture aligned along said flight path;

wherein said at least one packet of ions produced by said beam modulation assembly has a length greater than a distance between said at least two electrode plates for increasing the duty cycle and resolution of said time-of-flight mass spectrometer.

* * * * *